(12) United States Patent
Nishio et al.

(10) Patent No.: US 10,365,443 B2
(45) Date of Patent: Jul. 30, 2019

(54) CONNECTOR, RECEPTACLE, AND PLUG

(71) Applicant: Panasonic Intellectual Property Management Co., Ltd., Osaka (JP)

(72) Inventors: Toshiroh Nishio, Osaka (JP); Naoshi Usuki, Kyoto (JP); Satoshi Takahashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/770,967

(22) PCT Filed: Dec. 20, 2016

(86) PCT No.: PCT/JP2016/005194
§ 371 (c)(1),
(2) Date: Apr. 25, 2018

(87) PCT Pub. No.: WO2017/110088
PCT Pub. Date: Jun. 29, 2017

(65) Prior Publication Data
US 2018/0329151 A1    Nov. 15, 2018

(30) Foreign Application Priority Data

Dec. 22, 2015   (JP) .................................. 2015-250658

(51) Int. Cl.
*G02B 6/38*   (2006.01)
*H01R 13/46*   (2006.01)
(Continued)

(52) U.S. Cl.
CPC ............... *G02B 6/38* (2013.01); *H01R 13/46* (2013.01); *H01R 24/60* (2013.01); *G02B 6/32* (2013.01)

(58) Field of Classification Search
CPC . G02B 6/38; G02B 6/32; H01R 13/46; H01R 24/60
See application file for complete search history.

(56) References Cited

U.S. PATENT DOCUMENTS 7,351,066 B2 *   4/2008   DiFonzo ............ H01R 13/6205
                                                439/39
7,641,477 B2 *   1/2010   DiFonzo ............ H01R 13/6205
                                                439/39
(Continued)

FOREIGN PATENT DOCUMENTS

CN      103676023       3/2014
JP      6-096818        4/1994
(Continued)

OTHER PUBLICATIONS

International Search Report of PCT application No. PCT/JP2016/005194 dated Mar. 7, 2017.
(Continued)

*Primary Examiner* — Peter Radkowski
(74) *Attorney, Agent, or Firm* — McDermott Will & Emery LLP

(57) ABSTRACT

A connector includes a receptacle connectable to the conventional plug being compliant with an HDMI specification, and a plug connectable to the receptacle. The receptacle includes a tubular body forming a holding space that enables insertion of the conventional plug, a first recessed part forming a space that narrows heading from the holding space in an insertion direction of the plug, and a first transmission body having, as an end of an optical transmission line, a first end that is disposed to be exposed to the inserted plug. The plug includes an insertion part shaped to be insertable into the tubular body, a first projection that projects from the insertion part in the insertion direction and can fit into the first recessed part, and a second transmission (Continued)

body having, as an end of an optical transmission line, a second end that is disposed to face the first end.

16 Claims, 18 Drawing Sheets

(51) Int. Cl.
*H01R 24/60* (2011.01)
*G02B 6/32* (2006.01)

(56) References Cited

U.S. PATENT DOCUMENTS

| | | | | |
|---|---|---|---|---|
| 7,841,776 B2* | 11/2010 | DiFonzo | .............. | G02B 6/3817 385/53 |
| 8,339,760 B2* | 12/2012 | Rabu | ...................... | H01R 31/06 361/103 |
| 8,388,241 B2* | 3/2013 | He | ...................... | G02B 6/3885 385/139 |
| 8,497,753 B2* | 7/2013 | DiFonzo | .............. | H01R 13/641 335/205 |
| 8,702,316 B2* | 4/2014 | DiFonzo | .............. | G02B 6/3817 385/53 |
| 8,770,857 B2* | 7/2014 | DiFonzo | .............. | G02B 6/3817 385/53 |
| 8,888,500 B2* | 11/2014 | Gao | ...................... | H01R 13/17 439/39 |
| 8,970,332 B2* | 3/2015 | DiFonzo | .............. | H01R 13/641 335/205 |
| 9,039,304 B2 | 5/2015 | Ko et al. | | |
| 9,134,493 B2* | 9/2015 | Tong | .................... | G02B 6/4293 |
| 9,250,405 B2* | 2/2016 | Tong | .................... | G02B 6/4284 |
| 9,389,377 B2* | 7/2016 | Tong | .................... | G02B 6/4284 |
| 9,461,403 B2* | 10/2016 | Gao | ...................... | H01R 13/17 |
| 9,634,428 B2* | 4/2017 | DiFonzo | ............ | H01R 13/6205 |
| 9,923,290 B2* | 3/2018 | Gao | ...................... | H01R 13/17 |
| 2002/0197022 A1 | 12/2002 | Mine et al. | | |
| 2006/0040562 A1 | 2/2006 | Funatsu | | |
| 2007/0072442 A1* | 3/2007 | DiFonzo | ............ | H01R 13/6205 439/39 |
| 2008/0280461 A1* | 11/2008 | DiFonzo | ............ | H01R 13/6205 439/39 |
| 2010/0046891 A1 | 2/2010 | Sabo | | |
| 2010/0080563 A1* | 4/2010 | DiFonzo | .............. | G02B 6/3817 398/115 |
| 2010/0087071 A1* | 4/2010 | DiFonzo | ............ | H01R 13/6205 439/39 |
| 2010/0227487 A1 | 9/2010 | Masumoto et al. | | |
| 2010/0254667 A1* | 10/2010 | He | ...................... | G02B 6/3849 385/94 |
| 2010/0315752 A1* | 12/2010 | Rabu | .................. | H01R 13/6683 361/103 |
| 2011/0038582 A1* | 2/2011 | DiFonzo | .............. | G02B 6/3817 385/57 |
| 2012/0237170 A1 | 9/2012 | Ko | | |
| 2013/0005159 A1* | 1/2013 | Gao | ...................... | H01R 13/17 439/39 |
| 2013/0170794 A1* | 7/2013 | DiFonzo | .............. | G02B 6/3817 385/57 |
| 2013/0236144 A1* | 9/2013 | Tong | .................... | G02B 6/4293 385/89 |
| 2013/0316549 A1* | 11/2013 | DiFonzo | ............ | H01R 13/6205 439/39 |
| 2014/0133811 A1 | 5/2014 | Ko et al. | | |
| 2014/0178015 A1* | 6/2014 | Tong | .................... | G02B 6/4284 385/88 |
| 2015/0171550 A1* | 6/2015 | DiFonzo | ............ | H01R 13/6205 439/39 |
| 2015/0207267 A1* | 7/2015 | Gao | ...................... | H01R 13/17 439/39 |
| 2015/0338591 A1* | 11/2015 | Tong | .................... | G02B 6/4293 385/100 |
| 2016/0091669 A1 | 3/2016 | Bullock et al. | | |
| 2016/0131860 A1* | 5/2016 | Tong | .................... | G02B 6/4284 385/89 |
| 2017/0018863 A1* | 1/2017 | Gao | ...................... | H01R 13/17 |

FOREIGN PATENT DOCUMENTS

| | | |
|---|---|---|
| JP | 11-004546 | 1/1999 |
| JP | 2003-008064 | 1/2003 |
| JP | 2006-059646 | 3/2006 |
| JP | 2010-050092 | 3/2010 |
| JP | 2010-520569 | 6/2010 |
| JP | 2010-205662 | 9/2010 |
| JP | 2014-063177 | 4/2014 |
| JP | 2014-512564 | 5/2014 |
| WO | 2008/121731 | 10/2008 |
| WO | 2012/125234 | 9/2012 |

OTHER PUBLICATIONS

High-Definition Multimedia Interface Specification Ver. 1.3a, Nov. 10, 2006 and Supplement 1 Consumer Electronics Control (CEC), [searched on Dec. 1, 2015], Internet <URL:http://www.hdmi.org/manufacturer/specification.aspx>.

The Extended European Search Report dated Apr. 2, 2019 for the related European Patent Application No. 16877992.4.

* cited by examiner

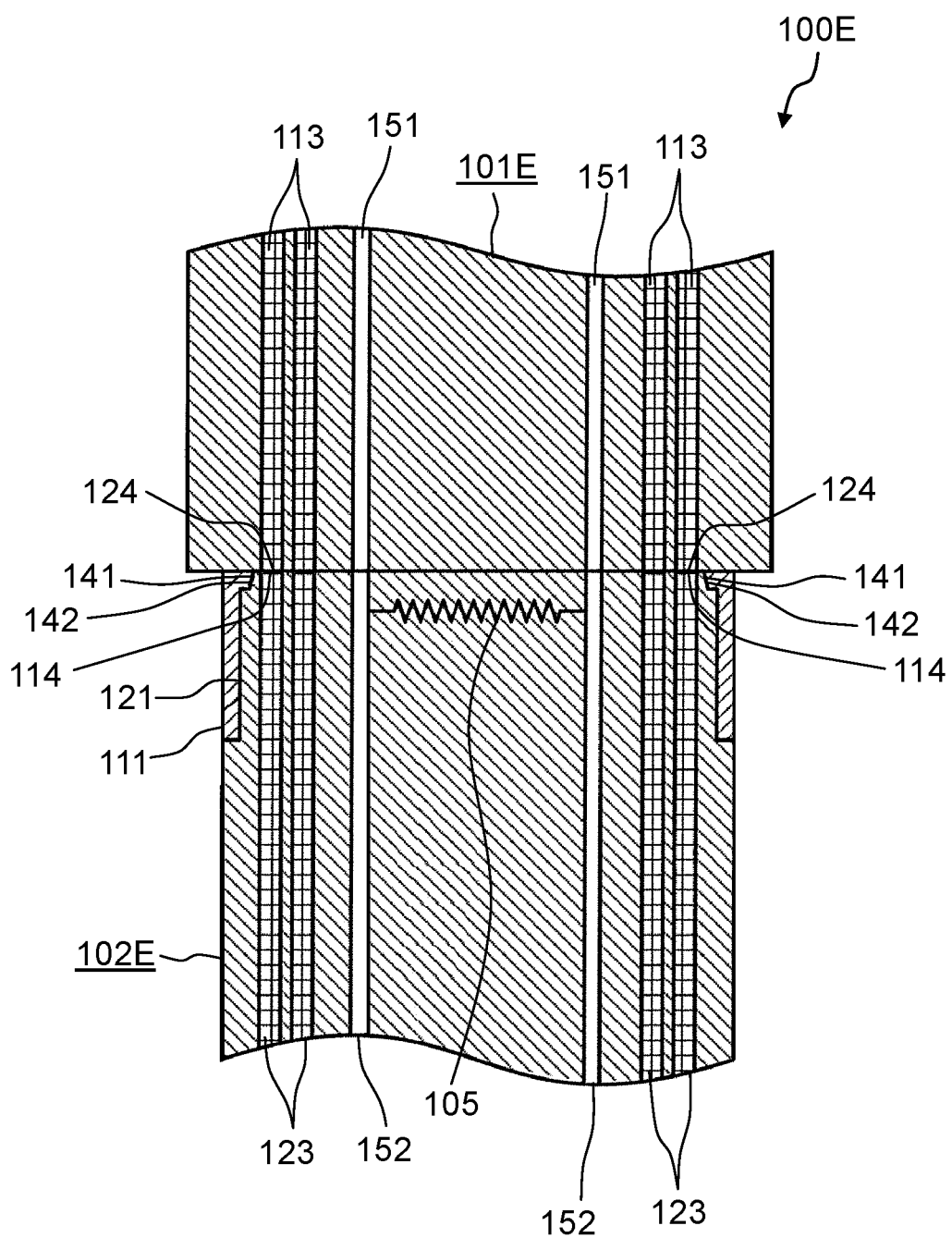

CONNECTOR, RECEPTACLE, AND PLUG

CROSS-REFERENCE TO RELATED APPLICATIONS

This application is a U.S. national stage application of the PCT International Application No. PCT/JP2016/005194 filed on Dec. 20, 2016, which claims the benefit of foreign priority of Japanese patent application No. 2015-250658 filed on Dec. 22, 2015, the contents all of which are incorporated herein by reference.

TECHNICAL FIELD

The present disclosure relates to a connector, a receptacle, and a plug that connect transmission lines for electric signals in compliant with a high definition multimedia interface (HDMI (registered trademark)) specification to each other and can also connect transmission lines for optical signals to each other.

BACKGROUND ART

A high definition multimedia interface (HDMI (registered trademark)) is a technique of a high definition digital video/audio interface, and this technique is widely used in transmission of high definition video/audio signals. An HDMI specification (see NPL 1, for example) provides specifications of an HDMI cable and an HDMI connector, so that even when applicable versions of the specification differ, a shape of a connector of Type A, for example, is not changed. Therefore, an old audio-visual (AV) device and a new AV device can be connected by the HDMI cable. Since the HDMI specification provides high compatibility as described above, a cable, a connector, and others that are compliant with the HDMI specification are widely used.

In this description and the claims, in some cases such a connector that is fully compliant with the HDMI specification is described as "a conventional connector", while a plug and a receptacle that form the conventional connector are described as "a conventional plug" and "a conventional receptacle", respectively.

In markets, high definition televisions including so-called 4K television sets (the television sets are hereinafter abbreviated as "televisions") are about to prevail, and higher definition televisions such as 8K televisions emerge as next-generation televisions. With such higher definition television screens, an information amount of video/audio signals to be transmitted also increases. For this reason, the HDMI specification alone can possibly cause an insufficient amount of information that can be transmitted with respect to an amount of information to be transmitted.

CITATION LIST

Non-Patent Literature

NPL 1: HDMI Specification Ver. 1.3a [searched on Dec. 1, 2015], Internet <URL:http://www.hdmi.org/manufacturer/specification.aspx>

SUMMARY

The present disclosure provides a connector, a receptacle, and a plug that can mechanically connect transmission lines for optical signals (hereinafter also described as "optical transmission lines") in addition to transmission lines for electric signals (hereinafter also described as "electric transmission lines") with connective compatibility with a conventional plug ensured.

The connector of the present disclosure includes a receptacle connectable to a conventional plug that is compliant with an HDMI specification, and a plug connectable to the receptacle. The receptacle includes a tubular body forming a holding space that enables insertion of the conventional plug, a first recessed part forming a space that narrows heading from the holding space in an insertion direction of the plug, and a first transmission body having, as an end of an optical transmission line, a first end that is disposed to be exposed to the inserted plug. The plug includes an insertion part shaped to be insertable into the tubular body, a first projection that projects from the insertion part in the insertion direction and can fit into the first recessed part, and a second transmission body having, as an end of an optical transmission line, a second end that is disposed to face the first end.

Alternatively, the connector according to the present disclosure includes a receptacle connectable to a conventional plug that is compliant with an HDMI specification, and a plug connectable to the receptacle. The receptacle includes a tubular body forming a holding space that enables insertion of the conventional plug, a pair of spring members that is respectively disposed on both ends of longitudinal direction of the tubular body inside the tubular body to have a spacing which decreases heading from an opening of the tubular body in an insertion direction of the plug in a section orthogonal to the insertion direction and that is deformed by the inserted conventional plug so that the spacing is increased, and a first transmission body having, as an end of an optical transmission line, a first end that is disposed to be exposed to the inserted plug. The plug includes an insertion part shaped to be insertable into the tubular body, slopes that are respectively disposed along both sides of the insertion part to have a spacing which decreases in the insertion direction and that respectively abut against the pair of spring members during insertion into the receptacle, and a second transmission body having, as an end of an optical transmission line, a second end that is disposed to face the first end.

The present disclosure enables connection between the respective ends of the optical transmission lines with high accuracy that is required of the optical transmission lines while ensuring connective compatibility with the conventional plug, thus facilitating connection of the transmission lines that are required to transmit a large amount of signals.

BRIEF DESCRIPTION OF DRAWINGS

FIG. 18 is a sectional view schematically illustrating a connector equipped with a heat generator according to another exemplary embodiment.

DESCRIPTION OF EMBODIMENTS

Figure 1:
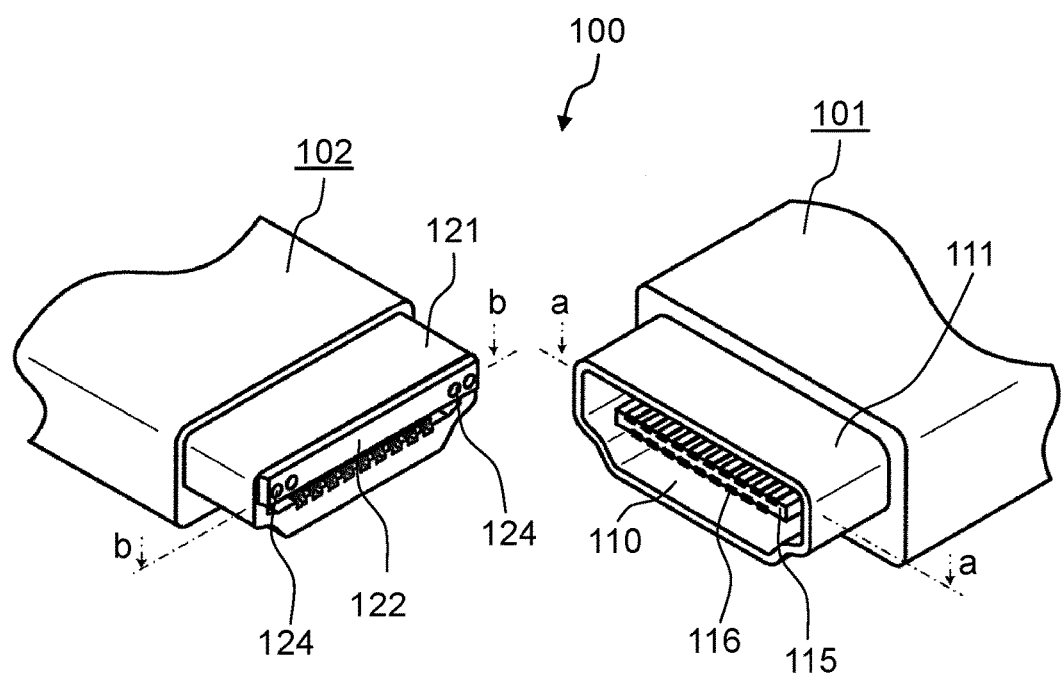
FIG. 1 is a perspective view schematically illustrating a connector with a plug removed from a receptacle according to a first exemplary embodiment.

Exemplary embodiments of a connector, a receptacle, and a plug of the present disclosure are hereinafter described with reference to the accompanying drawings. It is to be noted, however, that detailed descriptions that are more than necessary may be omitted. For example, detailed description of already well-known matters and repeated description of substantially the same structure are occasionally omitted for the purpose of preventing the following description from needlessly having redundancy, thereby facilitating understanding by those skilled in the art.

It is also to be noted that the following exemplary embodiments and the appended drawings are merely illustrative of the connector, the receptacle, and the plug of the present disclosure. Therefore, the scope of the present disclosure is defined by the recitations in the claims with the following exemplary embodiments used as references and thus is not limited to the following exemplary embodiments. Therefore, among constituent elements in the following exemplary embodiments, constituent elements that are not recited in any one of the independent claims indicating the most generic concepts of the present disclosure are not necessarily essential for achievement of the object of the present disclosure but are described as preferable components.

The drawings are schematic views in which emphasis, omission, and proportion adjustment are made as required for illustration of the present disclosure and may have shapes, positional relationships and proportions that differ from actual shapes, actual positional relationships, and actual proportions. In the drawings, substantially identical constituent elements have the same reference marks, and descriptions of those constituent elements may be omitted or simplified.

First Exemplary Embodiment

[1-1. Structure]

FIG. 1 is a perspective view schematically illustrating connector 100 with plug 102 removed from receptacle 101 according the first exemplary embodiment.

Figure 2:
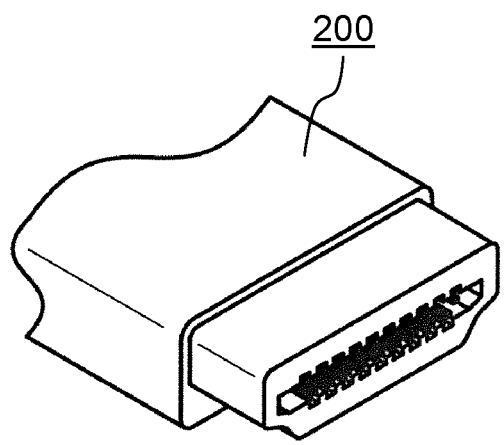
FIG. 2 is a perspective view schematically illustrating a conventional plug.

FIG. 2 is a perspective view schematically illustrating conventional plug 200.

Figure 3:
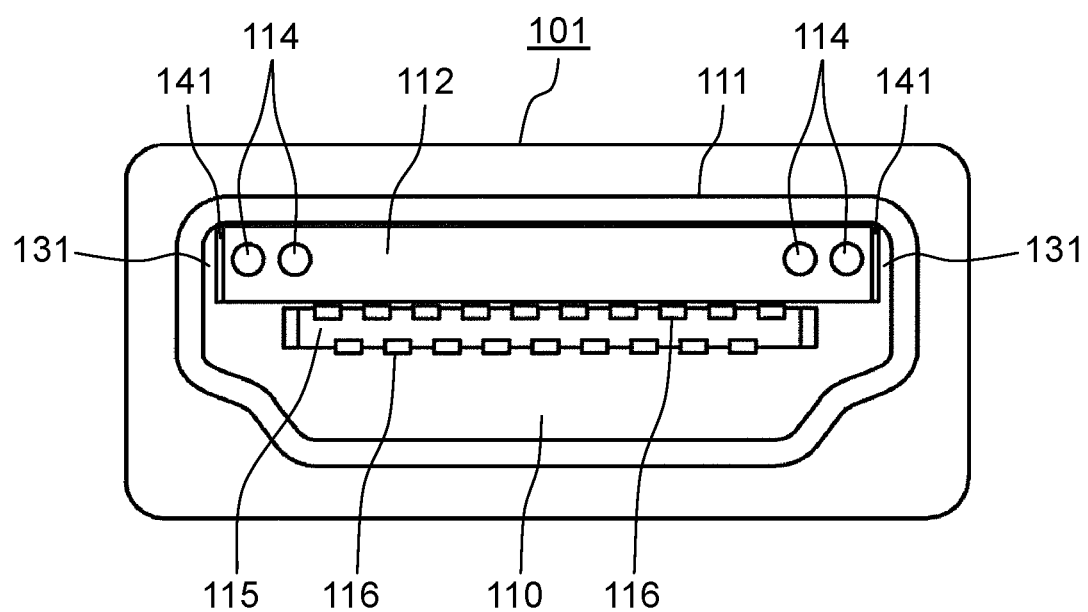
FIG. 3 is a front plan view of the receptacle according to the first exemplary embodiment.

FIG. 3 is a front plan view of receptacle 101 according to the first exemplary embodiment.

Figure 4:
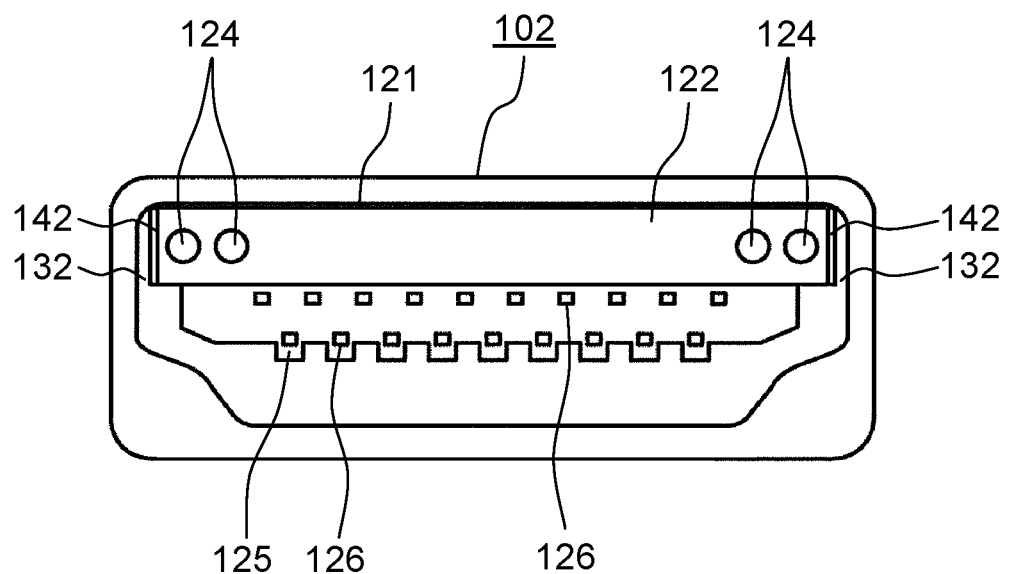
FIG. 4 is a front plan view of the plug according to the first exemplary embodiment.

FIG. 4 is a front plan view of plug 102 according to the first exemplary embodiment.

As illustrated in FIG. 1, connector 100 includes receptacle 101 and plug 102 that detachably connect transmission lines for high definition video/audio signals to each other.

Figure 5:
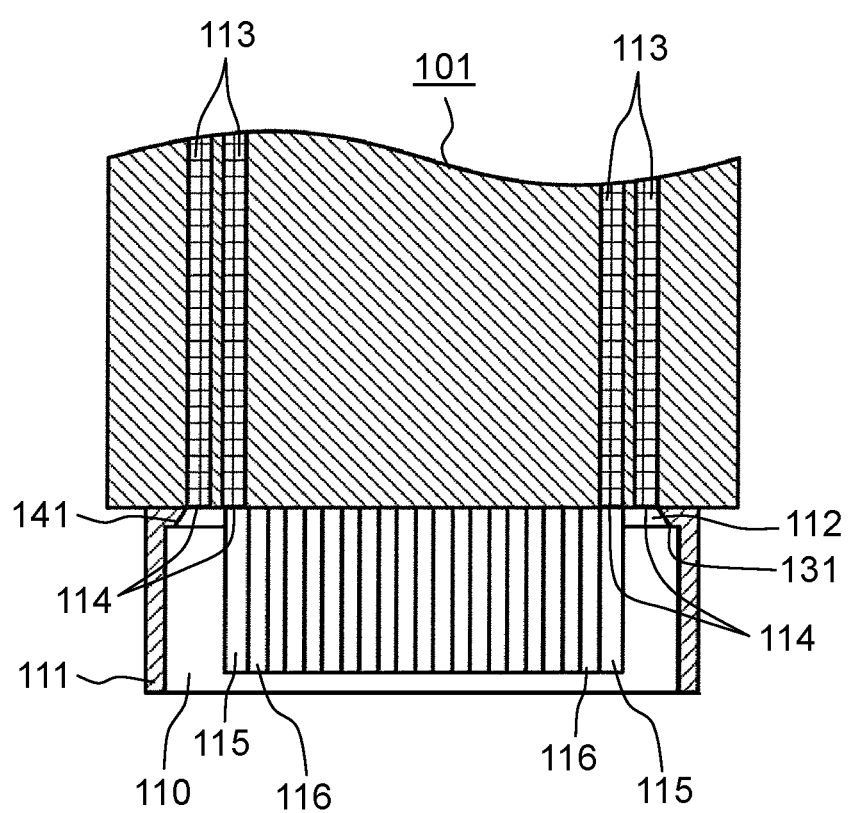
FIG. 5 is a sectional view schematically illustrating a section of the receptacle according to the first exemplary embodiment.

FIG. 5 is a sectional view schematically illustrating a section of receptacle 101 according to the first exemplary embodiment. The section of receptacle 101 that is illustrated in FIG. 5 is taken along line a-a of receptacle 101 illustrated in FIG. 1.

Receptacle 101 is a receptacle connectable to conventional plug 200 (see FIG. 2) that is compliant with an HDMI specification (version 1.3a, for example). As illustrated in FIGS. 1, 3, and 5, receptacle 101 includes tubular body 111, first recessed part 112, first transmission bodies 113, and first ends 114. Receptacle 101 also includes substrate 115 and a plurality of first terminals 116.

Tubular body 111 is a tubular member and forms holding space 110 that enables insertion of conventional plug 200. Specifically, holding space 110 of tubular body 111 is shaped to comply with the HDMI specification and is formed to be capable of holding conventional plug 200 in a state where conventional plug 200 is inserted. Tubular body 111 can also hold insertion part 121 of plug 102 that has been inserted into holding space 110.

First recessed part 112 is a part forming a space that gradually narrows heading from holding space 110 in an insertion direction of plug 102 (toward an inmost part of holding space 110 or upward in FIG. 5) to enable first projection 122 of plug 102 to fit into first recessed part 112. In the present exemplary embodiment, first recessed part 112 includes, as illustrated in FIGS. 3 and 5, step 131 against which a leading end face of conventional plug 200 partly abuts and first taper part 141 such that a distance between longitudinal sidewalls of first taper part 141 gradually decreases depth-ward from step 131. The space formed inside first recessed part 112 is of trapezoidal shape in the section illustrated in FIG. 5.

First transmission bodies 113 are transmission lines (optical transmission lines) that transmit optical signals. First transmission bodies 113 respectively have first ends 114 that are respective ends of the optical transmission lines. As illustrated in FIGS. 3 and 5, first ends 114 are disposed at receptacle 101 so as to respectively face and be exposed to second ends 124 provided to first projection 122 of insertion part 121 of plug 102 inserted into tubular body 111. In the present exemplary embodiment, first transmission bodies 113 are optical fibers formed of plastic as material, and these optical fibers each have a diameter of, for example, about 0.5 mm. As illustrated in FIG. 5, first ends 114 of first transmission bodies 113 are disposed at a bottom of first recessed part 112. With first ends 114 disposed at the bottom of first recessed part 112, adhesion of dust, dirt and others to first ends 114 and unwanted damage to first ends 114 can be suppressed.

Receptacle 101 includes, as illustrated in FIG. 5, the plurality of first transmission bodies (four first transmission bodies in the present exemplary embodiment) 113 and the plurality of first terminals 116 that is arranged on substrate 115 as illustrated in FIGS. 3 and 5. As illustrated in FIGS. 3 and 5, first transmission bodies 113 are mounted to receptacle 101 so as to be disposed on sides that are outer with respect to longitudinal ends of substrate 115 on which the plurality of first terminals 116 lines up with first ends 114 lining up in pairs between substrate 115 and tubular body 111.

It is to be noted that receptacle 101 may include lenses or the like that are used for connection of the optical transmission lines at respective first ends 114.

First terminals 116 are terminals provided in compliance with the HDMI specification for connection of electric transmission lines. Substrate 115 is an insulating member holding the arrangement of the plurality of first terminals 116 and includes the plurality of first terminals 116 on each of its front surface and its back surface. Substrate 115 is inserted into insertion part 121 of plug 102 that is inserted into holding space 110 of tubular body 111, and first terminals 116 are respectively connected to a plurality of second terminals 126 of plug 102. In this way, the electric transmission lines of receptacle 101 are electrically connected to electric transmission lines of plug 102, respectively.

Figure 6:
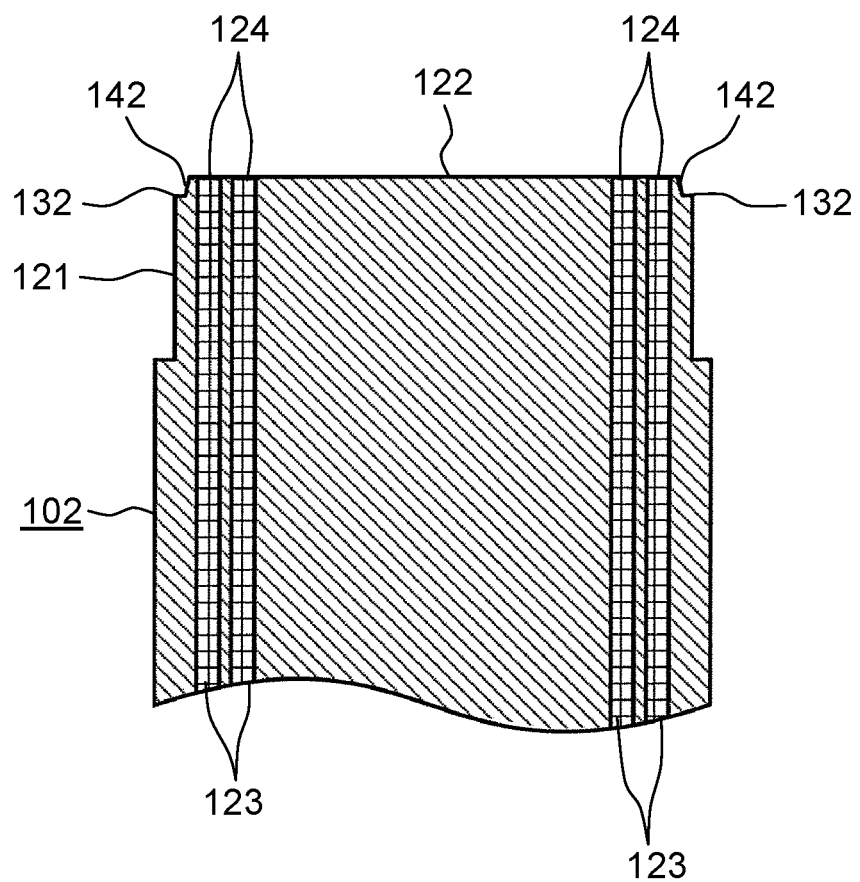
FIG. 6 is a sectional view schematically illustrating a section of the plug according to the first exemplary embodiment.

FIG. 6 is a sectional view schematically illustrating a section of plug 102 according to the first exemplary embodiment. FIG. 6 illustrates the section of plug 102 taken along line b-b of FIG. 1.

Plug 102 is a member connectable to receptacle 101. As illustrated in FIGS. 1, 4, and 6, plug 102 includes insertion part 121, first projection 122, second transmission bodies 123, and second ends 124. Plug 102 also includes a plurality of slots 125 and the plurality of second terminals 126.

Insertion part 121 is a part shaped to be insertable into tubular body 111 that forms holding space 110 enabling insertion of conventional plug 200. Specifically, insertion part 121 is shaped to comply with the HDMI specification and is held in holding space 110 of tubular body 111 similarly to conventional plug 200 when inserted into tubular body 111 of receptacle 101.

As illustrated in FIGS. 1 and 4, first projection 122 is a part provided on a leading edge of insertion part 121 to project from the leading edge of insertion part 121 in the insertion direction (in the direction of the leading edge of insertion part 121 or upward in FIG. 6). First projection 122 is formed to be capable of fitting into first recessed part 112 provided in receptacle 101. In the present exemplary embodiment, first projection 122 includes, as illustrated in FIGS. 4 and 6, shoulder 132 that abuts against step 131 provided inside tubular body 111 of receptacle 101, and second taper part 142 such that a distance between longitudinal sidewalls of second taper part 142 gradually decreases heading from shoulder 132 in the insertion direction. First projection 122 is formed in a trapezoidal projecting shape corresponding to first recessed part 112 in the section illustrated in FIG. 6. Second taper part 142 can position insertion part 121 of plug 102 with respect to tubular body 111 of receptacle 101 by sliding of second taper part 142 along first taper part 141.

Second transmission bodies 123 are transmission lines (optical transmission lines) that transmit optical signals. Second transmission bodies 123 respectively have second ends 124 that are respective ends of the optical transmission lines. As illustrated in FIGS. 4 and 6, second ends 124 are disposed at first projection 122 of plug 102 so as to respectively face first ends 114 of receptacle 101 into which plug 102 is inserted. In the present exemplary embodiment, second transmission bodies 123 are optical fibers formed of plastic as material similarly to first transmission bodies 113, and these optical fibers each have a diameter of, for example, about 0.5 mm. As illustrated in FIGS. 4 and 6, second ends 124 of second transmission bodies 123 are disposed in respective positions of a leading end face of first projection 122, and these positions respectively correspond to positions (see FIGS. 3 and 5) in which first ends 114 are respectively disposed.

Plug 102 includes, as illustrated in FIG. 6, the plurality of second transmission bodies (four second transmission bodies in the present exemplary embodiment) 123 that respectively corresponds to the plurality of first transmission bodies (four first transmission bodies in the present exemplary embodiment) 113 (see FIG. 5). Further, plug 102 includes, as illustrated in FIG. 4, the plurality of second terminals 126 and the plurality of slots 125 that are arranged. As illustrated in FIGS. 4 and 6, second transmission bodies 123 are mounted to plug 102 so as to be disposed outwardly both ends of the arrangement of the plurality of second terminals 126 (slots 125) with second ends 124 lining up in pairs at the leading end face of first projection 122.

It is to be noted that plug 102 may include lenses or the like that are used for connection of the optical transmission lines at respective second ends 124 correspondingly to first ends 114.

Second terminals 126 are electrically conductive members. Second terminals 126 are mounted to plug 102 in a state projecting in the insertion direction so that when insertion part 121 of plug 102 is inserted into tubular body 111 of receptacle 101, biasing force is generated toward first terminals 116 of receptacle 101. Slots 125 are groove-shaped parts formed in an inner wall surface of insertion part 121 of plug 102. Slots 125 are formed to serve as respective relief allowances for second terminals 126 when insertion part 121 of plug 102 is inserted into tubular body 111 of receptacle 101, and when second terminals 126 are pushed to open to be away from substrate 115 upon contact with respective first terminals 116 provided on the surface of substrate 115 of receptacle 101.

[1-2. Connection Status]

Figure 7:
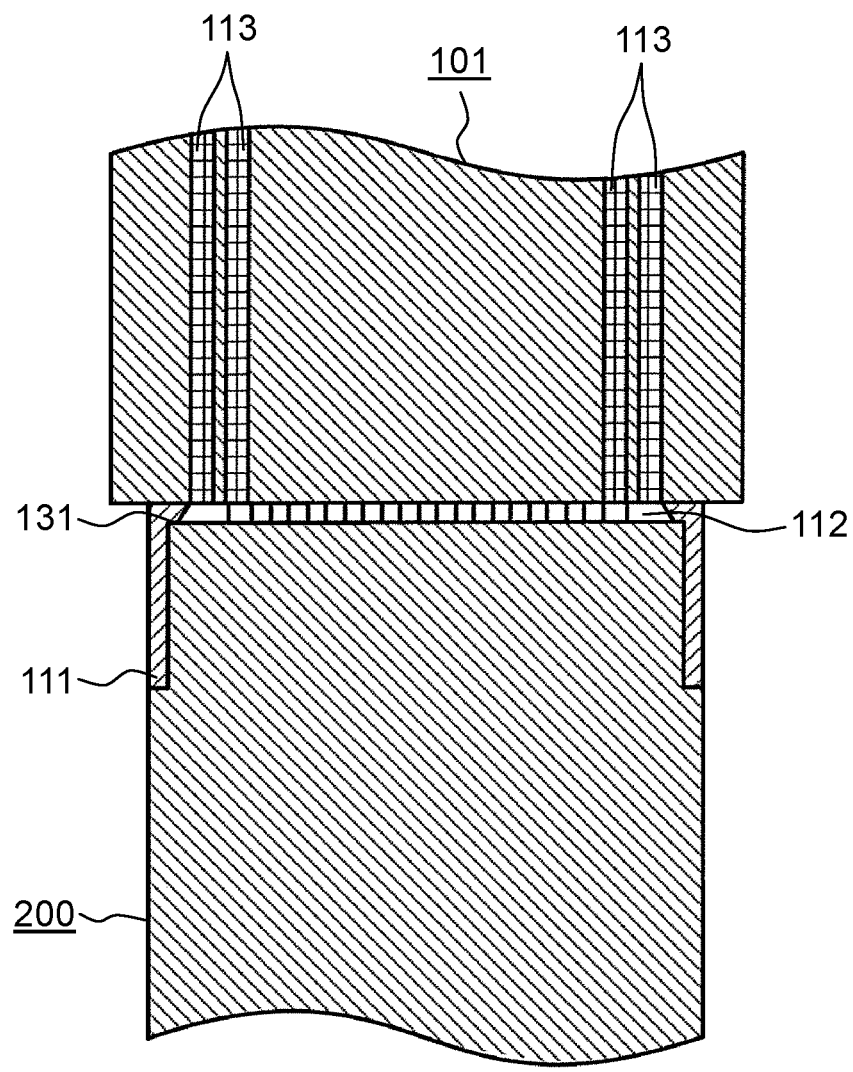
FIG. 7 is a sectional view schematically illustrating a state of connection between the receptacle and the conventional plug according to the first exemplary embodiment.

FIG. 7 is a sectional view schematically illustrating a state of connection between receptacle 101 and conventional plug 200 according to the first exemplary embodiment.

As illustrated in FIG. 7, receptacle 101 of connector 100 having the above structure enables insertion of conventional plug 200 into tubular body 111 of receptacle 101 and enables inserted conventional plug 200 to be held inside holding space 110 of tubular body 111. In this way, the electric transmission lines compliant with the HDMI specification can be connected between receptacle 101 and conventional plug 200.

Figure 8:
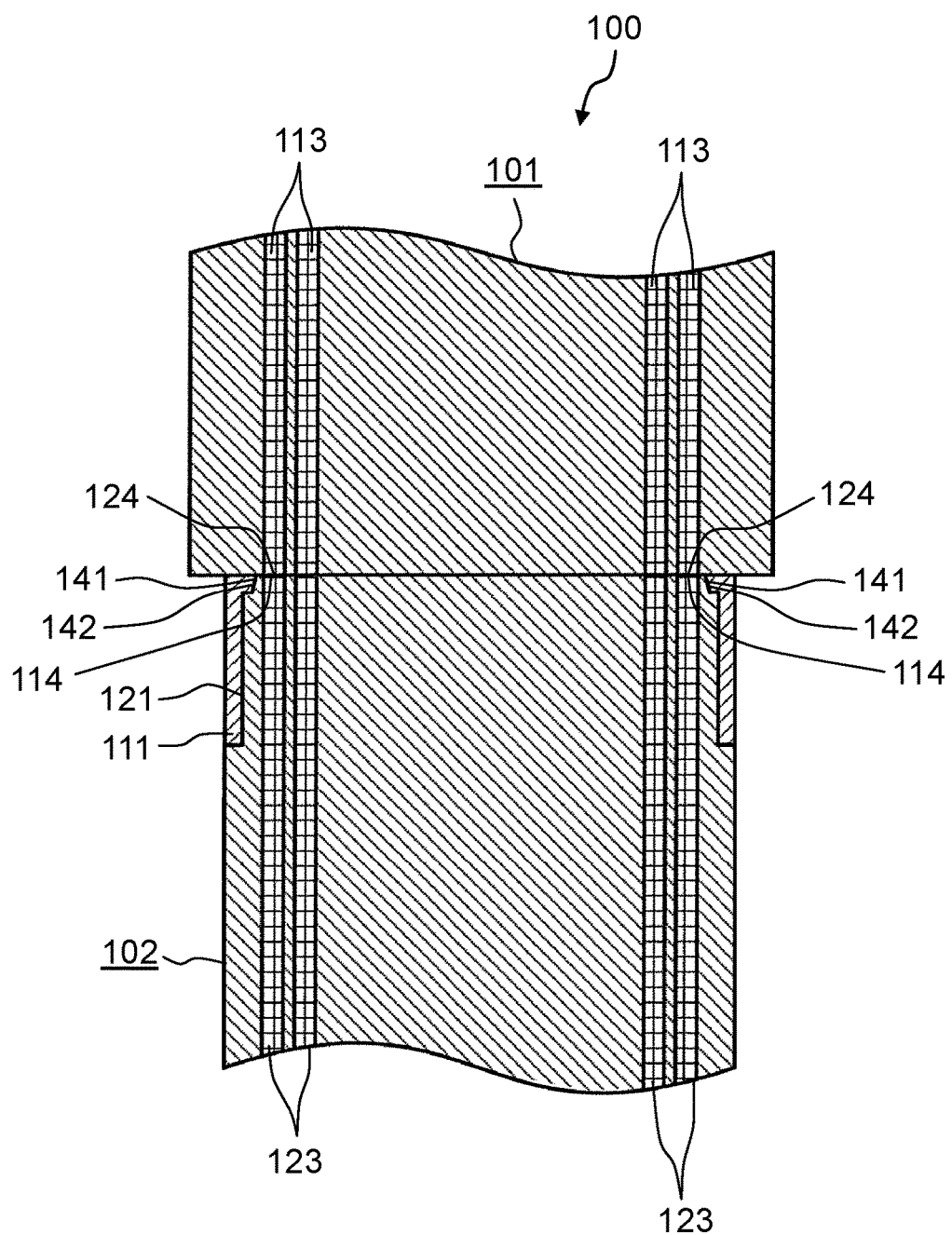
FIG. 8 is a sectional view schematically illustrating a state of connection between the plug and the receptacle according to the first exemplary embodiment.

FIG. 8 is a sectional view schematically illustrating a state of connection between plug 102 and receptacle 101 according to the first exemplary embodiment.

With connector 100 illustrated in the present exemplary embodiment, when insertion part 121 of plug 102 is inserted into tubular body 111 of receptacle 101 as illustrated in FIG. 8, first taper part 141 (see FIG. 5) that is an inner wall of first recessed part 112 of receptacle 101 and second taper part 142 (see FIG. 6) that is an outer wall of first projection 122 of plug 102 abut against each other. In this way, insertion part 121 can be positioned with increased accuracy inside holding space 110 of tubular body 111 in connector 100 during insertion of insertion part 121 of plug 102 into tubular body 111 of receptacle 101. Thus, even when where dimensional tolerances of tubular body 111 and insertion part 121 are larger, connector 100 illustrated in the present exemplary embodiment enables respective first ends 114 of first transmission bodies 113 to respectively abut against respective second ends 124 of second transmission bodies 123 with increased accuracy. Consequently, the optical transmission lines (first transmission bodies 113) of receptacle 101 can respectively be connected with the optical transmission lines (second transmission bodies 123) of plug 102 with increased accuracy in connector 100.

[1-3. Effects and Others]

As described above, in the present exemplary embodiment, a connector includes a receptacle connectable to a conventional plug that is compliant with an HDMI specification, and a plug connectable to the receptacle. The receptacle includes a tubular body forming a holding space that enables insertion of the conventional plug, a first recessed part forming a space that narrows heading from the holding space in an insertion direction of the plug, and a first transmission body having, as an end of an optical transmission line, a first end that is disposed to be exposed to the inserted plug. The plug includes an insertion part shaped to be insertable into the tubular body, a first projection that projects from the insertion part in the insertion direction and can fit into the first recessed part, and a second transmission body having, as an end of an optical transmission line, a second end that is disposed to face the first end.

It is to be noted that connector 100 is one example of the connector. Conventional plug 200 is one example of the conventional plug. Receptacle 101 is one example of the receptacle. Plug 102 is one example of the plug. Holding space 110 is one example of the holding space. Tubular body 111 is one example of the tubular body. First recessed part 112 is one example of the first recessed part. First end 114 is one example of the first end. First transmission body 113 is one example of the first transmission body. Insertion part 121 is one example of the insertion part. First projection 122 is one example of the first projection. Second end 124 is one example of the second end. Second transmission body 123 is one example of the second transmission body.

In the example described in the first exemplary embodiment, for example, connector 100 includes receptacle 101 connectable to conventional plug 200 that is compliant with the HDMI specification, and plug 102 connectable to receptacle 101. Receptacle 101 includes tubular body 111 forming holding space 110 that enables insertion of conventional plug 200, first recessed part 112 forming the space that narrows heading from holding space 110 in the insertion direction of plug 102, and first transmission bodies 113 respectively having, as the respective ends of the optical transmission lines, first ends 114 that are disposed to be exposed to plug 102 that has inserted. Plug 102 includes insertion part 121 shaped to be insertable into tubular body 111, first projection 122 that projects from insertion part 121 in the insertion direction and can fit into first recessed part 112, and second transmission bodies 123 respectively having, as the respective ends of the optical transmission lines, second ends 124 that are disposed to face first ends 114, respectively.

With connector 100 thus formed as above, conventional plug 200 can be inserted into tubular body 111 of receptacle 101 and can be held in holding space 110 of tubular body 111 when inserted. In this way, the electric transmission lines compliant with the HDMI specification can be connected between receptacle 101 and conventional plug 200.

Furthermore, with connector 100, when insertion part 121 of plug 102 is inserted into tubular body 111 of receptacle 101, first recessed part 112 of receptacle 101 and first projection 122 of plug 102 fit each other. In this way, insertion part 121 can be positioned with increased accuracy inside holding space 110 of tubular body 111 in connector 100 during insertion of insertion part 121 of plug 102 into tubular body 111 of receptacle 101. Therefore, connector 100 enables respective first ends 114 of first transmission bodies 113 to respectively abut against respective second ends 124 of second transmission bodies 123 with increased accuracy. Consequently, the optical transmission lines (first transmission bodies 113) of receptacle 101 can respectively be connected with the optical transmission lines (second transmission bodies 123) of plug 102 with increased accuracy in connector 100.

In the connector, the first end may be disposed at a bottom of the first recessed part, while the second end may be disposed at a projecting edge of the first projection.

In the example described in the first exemplary embodiment, for example, connector 100 has first ends 114 disposed at the bottom of first recessed part 112, and second ends 124 disposed at a projecting edge of first projection 122.

With connector 100 thus configured, adhesion of dust, dirt and others to first ends 114 and unwanted damage to first ends 114 can be suppressed.

In the connector, the receptacle may include the first transmission body on each of sides that are outer with respect to both ends of an arrangement of a plurality of first terminals used for connection of the electric transmission lines. The plug may include the second transmission body, which corresponds to the first transmission body, on each of sides that are outer with respect to both ends of an arrangement of a plurality of second terminals to be respectively connected to the plurality of first terminals.

It is to be noted that first terminal 116 is one example of the first terminal. Second terminal 126 is one example of the second terminal.

In the example described in the first exemplary embodiment, for example, receptacle 101 of connector 100 includes first transmission bodies 113 on the sides that are outer with respect to the ends of the arrangement of the plurality of first terminals 116 used for connection of the electric transmission lines. Plug 102 includes second transmission bodies 123, which respectively correspond to first transmission bodies 113, on the sides that are outer with respect to the ends of the arrangement of the plurality of second terminals 126 to be connected to first terminals 116, respectively.

With connector 100 thus configured, the optical transmission lines (first transmission bodies 113) of receptacle 101 can respectively be connected with the optical transmission lines (second transmission bodies 123) of plug 102 with accuracy while connective compatibility is maintained with a conventional receptacle or plug that is compliant with the HDMI specification.

Second Exemplary Embodiment

Connector 100A, receptacle 101A, and plug 102A according to a second exemplary embodiment are described below. Connector 100A includes receptacle 101A and plug 102A.

It is to be noted that, in the following description, constituent elements that are substantially identical to the constituent elements included in connector 100 described in the first exemplary embodiment have the same reference marks, and descriptions of those constituent elements are occasionally omitted. In addition, descriptions of matters described in the first exemplary embodiment are omitted and matters differ from the matters in the first exemplary embodiment are mainly described. Descriptions of contents that are identical to the contents of the first exemplary embodiment are occasionally omitted.

[2-1. Structure]

Figure 9:
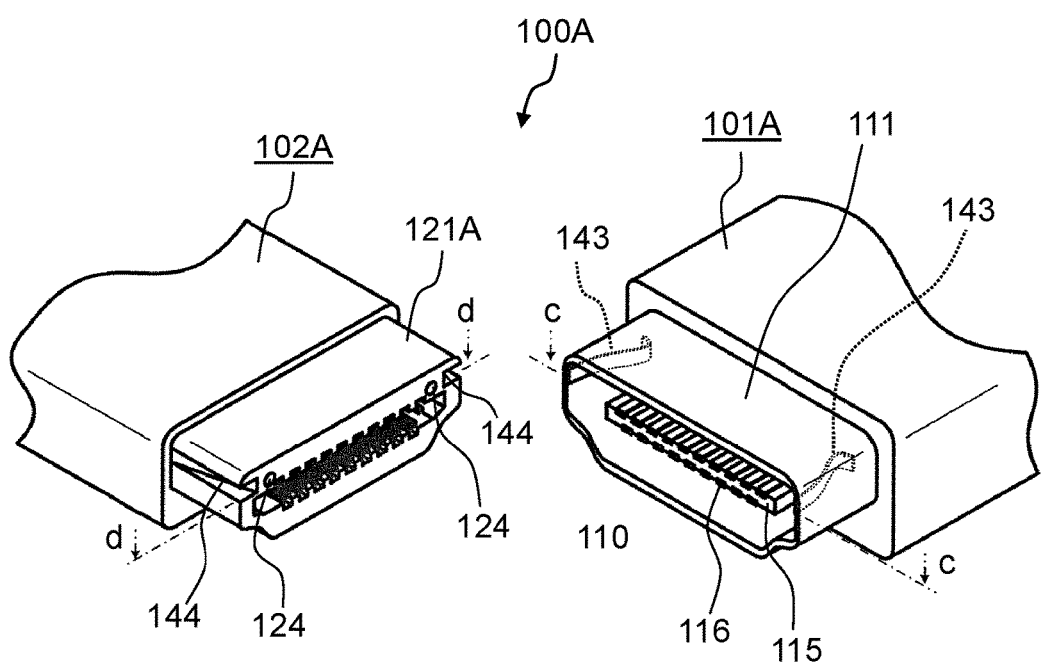
FIG. 9 is a perspective view schematically illustrating a connector with a plug removed from a receptacle according a second exemplary embodiment.

FIG. 9 is a perspective view schematically illustrating connector 100A with plug 102A removed from receptacle 101A according the second exemplary embodiment.

Figure 10:
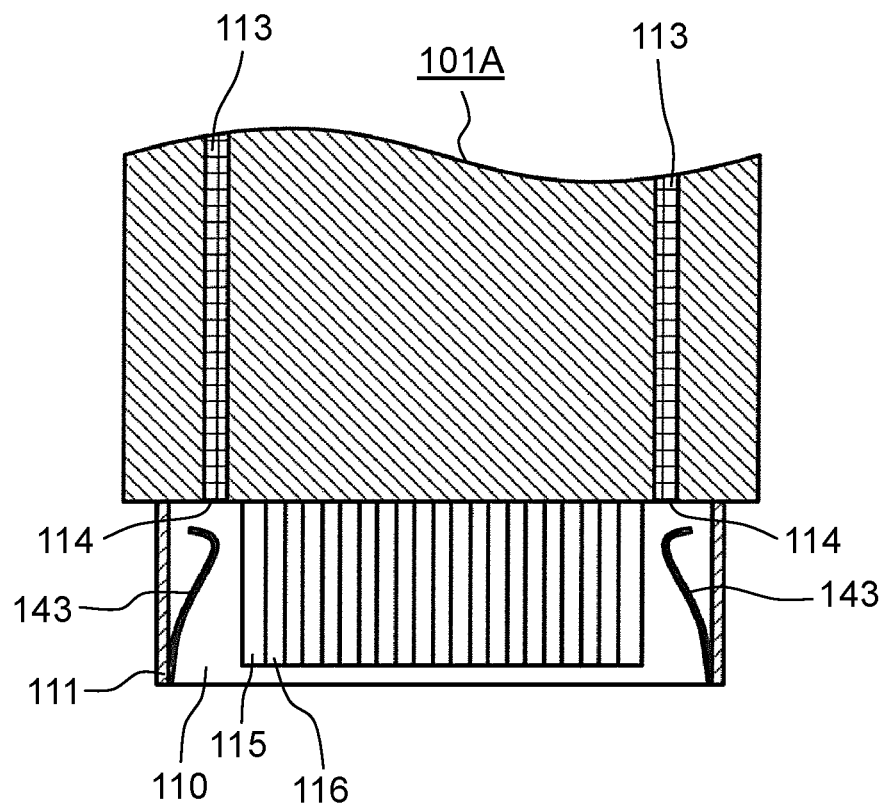
FIG. 10 is a sectional view schematically illustrating a section of the receptacle according to the second exemplary embodiment.

FIG. 10 is a sectional view schematically illustrating a section of receptacle 101A according to the second exemplary embodiment. FIG. 10 illustrates the section of receptacle 101A taken along line c-c of FIG. 9.

Figure 11:
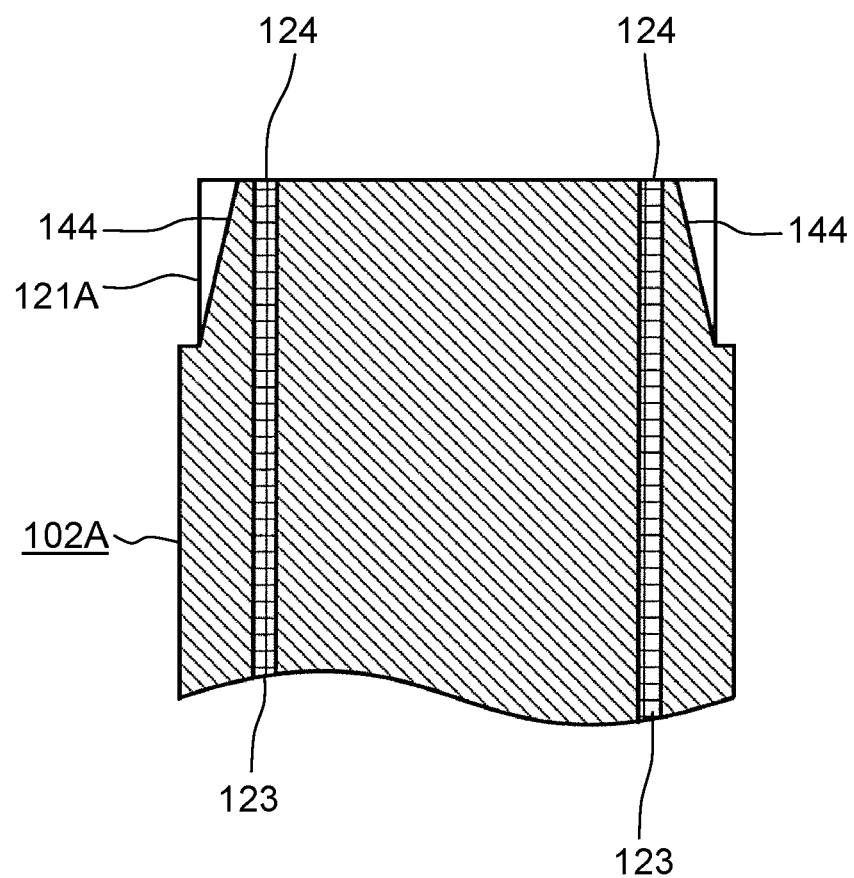
FIG. 11 is a sectional view schematically illustrating a section of the plug according to the second exemplary embodiment.

FIG. 11 is a sectional view schematically illustrating a section of plug 102A according to the second exemplary embodiment. FIG. 11 illustrates the section of plug 102A taken along line d-d of FIG. 9.

Figure 12:
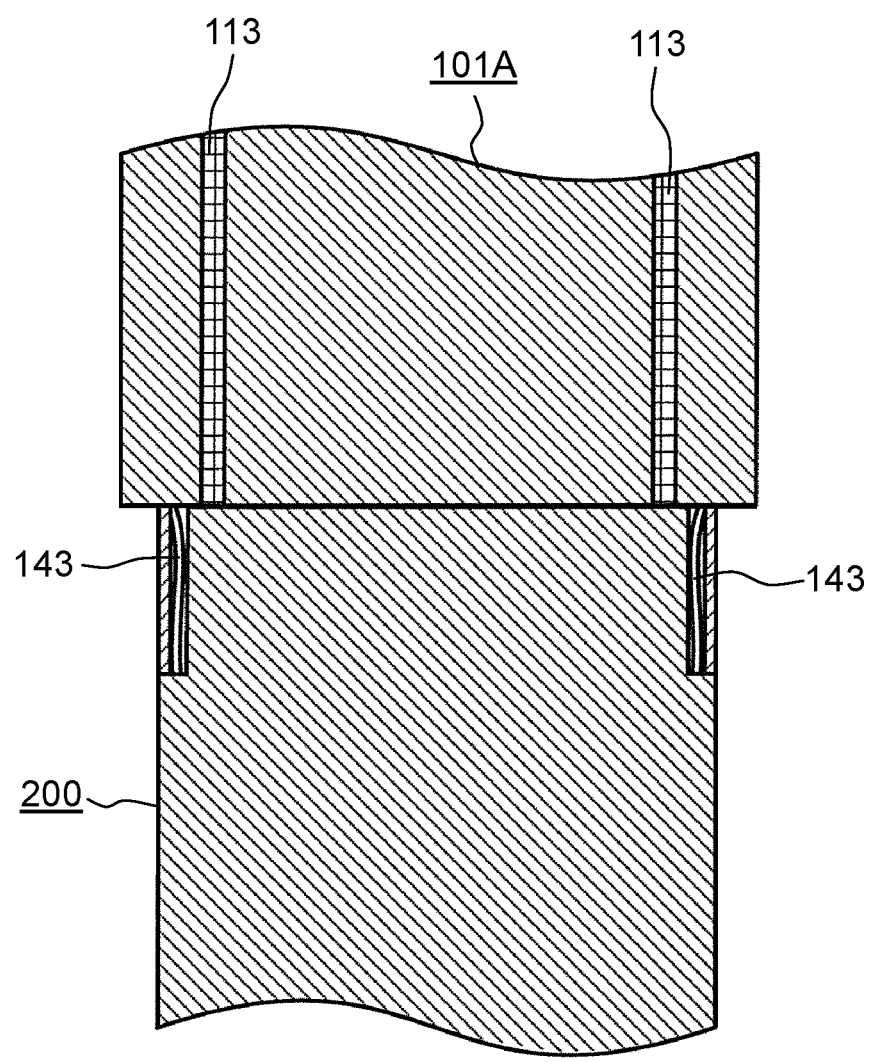
FIG. 12 is a sectional view schematically illustrating a state of connection between the receptacle and the conventional plug according to the second exemplary embodiment.
Figure 13:
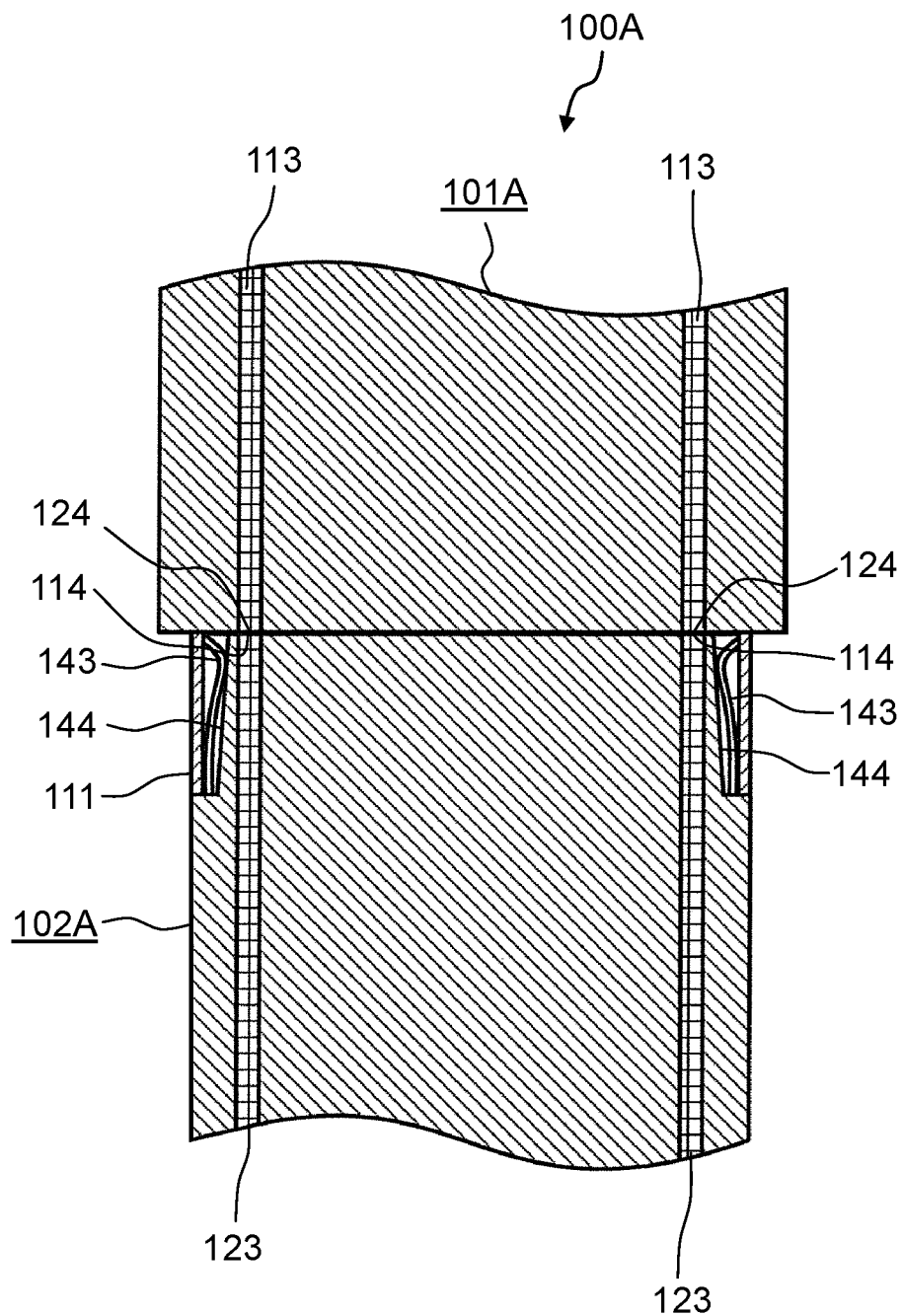
FIG. 13 is a sectional view schematically illustrating a state of connection between the plug and the receptacle according to the second exemplary embodiment.

Receptacle 101A has substantially the same structure as receptacle 101 described in the first exemplary embodiment. However, receptacle 101A differs from receptacle 101 described in the first exemplary embodiment in that receptacle 101A further includes a pair of spring members 143 inside tubular body 111. It is to be noted that receptacle 101A may not include first recessed part 112. FIGS. 10, 12, and 13 illustrate a structure of receptacle 101A not including first recessed part 112.

As illustrated in FIGS. 9 and 10, the pair of spring members 143 is respectively disposed on longitudinal ends of tubular body 111 inside tubular body 111 and is configured so that a spacing between spring members 143 decreases heading from an opening of tubular body 111 in an insertion direction of plug 102A (or conventional plug 200). Spring members 143 have elasticity such that spring members 143 are deformed by conventional plug 200 inserted into tubular body 111 of receptacle 101A in a state that the spacing between spring members 143 is gradually increased and spring members 143 spring back into position after conventional plug 200 is pulled out of tubular body 111.

Plug 102A has substantially the same structure as plug 102 described in the first exemplary embodiment, and insertion part 121A of plug 102A has substantially the same structure as insertion part 121 described in the first exemplary embodiment. However, plug 102A differs from plug 102 described in the first exemplary embodiment in that plug 102A further includes a pair of slopes 144 along respective longitudinal sides of insertion part 121A. It is to be noted that insertion part 121A of plug 102A may not include first projection 122. FIGS. 9, 11, and 13 illustrate a structure of insertion part 121A not including first projection 122.

As illustrated in FIGS. 9 and 11, the pair of slopes 144 is provided along the respective longitudinal sides of insertion part 121A so that a spacing between slopes 144 gradually decreases toward a leading edge of insertion part 121A (that is to say, in the direction of insertion into tubular body 111). Moreover, slopes 144 are formed to respectively abut against spring members 143 when insertion part 121A of plug 102A is inserted into tubular body 111 of receptacle 101A. In the present exemplary embodiment, slopes 144 are provided on respective bottoms of grooves each formed to have a width that enables fitting of each of spring members 143 as illustrated in FIG. 9.

[2-2. Connection Status]

FIG. 12 is a sectional view schematically illustrating a state of connection between receptacle 101A and conventional plug 200 according to the second exemplary embodiment.

As illustrated in FIG. 12, receptacle 101A of connector 100A having the above structure enables insertion of conventional plug 200 into tubular body 111 of receptacle 101A and enables inserted conventional plug 200 to be held inside holding space 110 of tubular body 111. Here, spring members 143 are shoved open by conventional plug 200 inside tubular body 111, and conventional plug 200 is held in holding space 110 of tubular body 111 by a biasing force of spring members 143. In this way, electric transmission lines compliant with the HDMI specification can be connected between receptacle 101A and conventional plug 200.

FIG. 13 is a sectional view schematically illustrating a state of connection between plug 102A and receptacle 101A according to the second exemplary embodiment.

With connector 100A illustrated in the present exemplary embodiment, when insertion part 121A of plug 102A is inserted into tubular body 111 of receptacle 101A as illustrated in FIG. 13, spring members 143 respectively fit into the grooves provided in the respective sides of insertion part 121A of plug 102A and respectively abut against slopes 144 that are the bottoms of the grooves. In this way, insertion part 121A can be positioned with increased accuracy inside holding space 110 of tubular body 111 in connector 100A during insertion of insertion part 121A of plug 102A into tubular body 111 of receptacle 101A. Thus, even when dimensional tolerances of tubular body 111 and insertion part 121A are larger, connector 100A illustrated in the present exemplary embodiment enables respective first ends 114 of first transmission bodies 113 to respectively abut against second ends 124 of second transmission bodies 123 with increased accuracy. Consequently, optical transmission lines (first transmission bodies 113) of receptacle 101A can respectively be connected with optical transmission lines (second transmission bodies 123) of plug 102A with increased accuracy in connector 100A.

It is to be noted that the first exemplary embodiment has described the configuration that receptacle 101 includes four first transmission bodies 113 and four first ends 114, while plug 102 includes four second transmission bodies 123 and four second ends 124. However, first transmission bodies 113 are not limited to four in number in the present disclosure, and the same goes for first ends 114, second transmission bodies 123, and second ends 124. For example, as illustrated in FIGS. 10 and 11, receptacle 101A may include two first transmission bodies 113 and two first ends 114, while plug 102A may include two second transmission bodies 123 and two second ends 124. Alternatively, a number of first transmission bodies 113 of the connector may be another numerical value, and the same goes for first ends 114, second transmission bodies 123, and second ends 124 of the connector.

[2-3. Effects and Others]

As described above, in the present exemplary embodiment, a connector includes a receptacle connectable to a conventional plug that is compliant with an HDMI specification, and a plug connectable to the receptacle. The receptacle includes a tubular body forming a holding space that enables insertion of the conventional plug, a pair of spring members that is respectively disposed on both ends in longitudinal direction of the tubular body inside the tubular body to have a spacing which decreases heading from an opening of the tubular body in an insertion direction of the plug in a section orthogonal to the insertion direction and that is deformed by the inserted conventional plug so that the spacing is increased, and a first transmission body having, as an end of an optical transmission line, a first end that is disposed to be exposed to the inserted plug. The plug includes an insertion part shaped to be insertable into the tubular body, slopes that are respectively disposed along both sides of the insertion part to have a spacing which decreases in the insertion direction and that respectively abut against the pair of spring members during insertion into the receptacle, and a second transmission body having, as an end of an optical transmission line, a second end that is disposed to face the first end.

It is to be noted that connector 100A is one example of the connector. Conventional plug 200 is one example of the conventional plug. Receptacle 101A is one example of the receptacle. Plug 102A is one example of the plug. Holding space 110 is one example of the holding space. Tubular body 111 is one example of the tubular body. Spring member 143 is one example of the spring member. First end 114 is one example of the first end. First transmission body 113 is one example of the first transmission body. Insertion part 121A is one example of the insertion part. Slope 144 is one example of the slope. Second end 124 is one example of the second end. Second transmission body 123 is one example of the second transmission body.

In the example described in the second exemplary embodiment, for example, connector 100A includes receptacle 101A connectable to conventional plug 200 that is compliant with the HDMI specification, and plug 102A connectable to receptacle 101A. Receptacle 101A includes tubular body 111 forming holding space 110 that enables insertion of conventional plug 200, the pair of spring members 143 that is respectively disposed on both ends in the longitudinal direction of tubular body 111 inside tubular body 111 to have the spacing which decreases heading from the opening of tubular body 111 in the insertion direction of plug 102A in the section orthogonal to the insertion direction and that is deformed by inserted conventional plug 200 so that the spacing is increased, and first transmission bodies 113 respectively having, as the respective ends of the optical transmission lines, first ends 114 that are disposed to be exposed to inserted plug 102A. Plug 102A includes insertion part 121A shaped to be insertable into tubular body 111, slopes 144 that are respectively disposed along both sides of insertion part 121A to have the spacing which decreases in the insertion direction and that respectively abut against spring members 143 during inserted into receptacle 101A, and second transmission bodies 123 respectively having, as the respective ends of the optical transmission lines, second ends 124 that are disposed to face first ends 114, respectively.

With connector 100A thus formed as above, conventional plug 200 can be inserted into tubular body 111 of receptacle 101A and inserted conventional plug 200 can be held in holding space 110 of tubular body 111. Here, spring members 143 are shoved open by conventional plug 200 inside tubular body 111, so that conventional plug 200 is held in holding space 110 of tubular body 111 by the biasing force of spring members 143. In this way, the electric transmission lines compliant with the HDMI specification can be connected between receptacle 101A and conventional plug 200.

Furthermore, with connector 100A, when insertion part 121A of plug 102A is inserted into tubular body 111 of receptacle 101A, spring members 143 respectively abut against slopes 144 that are provided along the sides of insertion part 121A of plug 102A. In this way, insertion part 121A can be positioned with increased accuracy inside holding space 110 of tubular body 111 in connector 100A during insertion of insertion part 121A of plug 102A into tubular body 111 of receptacle 101A. Therefore, connector 100A enables respective first ends 114 of first transmission bodies 113 to respectively abut against second ends 124 of second transmission bodies 123 with increased accuracy. Consequently, the optical transmission lines (first transmission bodies 113) of receptacle 101A can respectively be connected with the optical transmission lines (second transmission bodies 123) of plug 102A with increased accuracy in connector 100A.

In the connector, the slopes may be disposed as bottoms of groove formed to have width that enables insertion of the pair of spring members, respectively.

In the example described in the second exemplary embodiment, for example, slopes 144 of connector 100A are disposed as the bottoms of the grooves each formed to have the width that enables insertion of each of spring members 143.

In connector 100A thus configured, when insertion part 121A of plug 102A is inserted into tubular body 111 of receptacle 101A, spring members 143 respectively fit into the grooves provided in the sides of insertion part 121A of plug 102A and respectively abut against slopes 144 that are the bottoms of the grooves. In this way, insertion part 121A can be positioned with increased accuracy inside holding space 110 of tubular body 111 in connector 100A during insertion of insertion part 121A of plug 102A into tubular body 111 of receptacle 101A. Therefore, connector 100A enables first ends 114 of first transmission bodies 113 to respectively abut against second ends 124 of second transmission bodies 123 with increased accuracy. Consequently, the optical transmission lines (first transmission bodies 113) of receptacle 101A can respectively be connected with the optical transmission lines (second transmission bodies 123) of plug 102A with increased accuracy in connector 100A.

Other Exemplary Embodiments

The first and second exemplary embodiments have been described above as being illustrative of the technique disclosed in the present application but are not restrictive of the present disclosure. For example, other exemplary embodiments that are realized by combining the constituent elements of choice that are described in this description or excluding some of the constituent elements may also be exemplary embodiments of the present disclosure. In addition, modifications obtainable by various changes to the above exemplary embodiments that are conceived by those skilled in the art without departing from the essence of the present disclosure, that is to say, the meaning of the recitations in the claims are also included in the present disclosure.

Therefore, other exemplary embodiments are described below.

It is to be noted that, in the following description, constituent elements that are substantially identical to the constituent elements of connector 100 described in the first exemplary embodiment or connector 100A described in the second exemplary embodiment have the same reference marks, and descriptions of those constituent elements are omitted.

Figure 14:
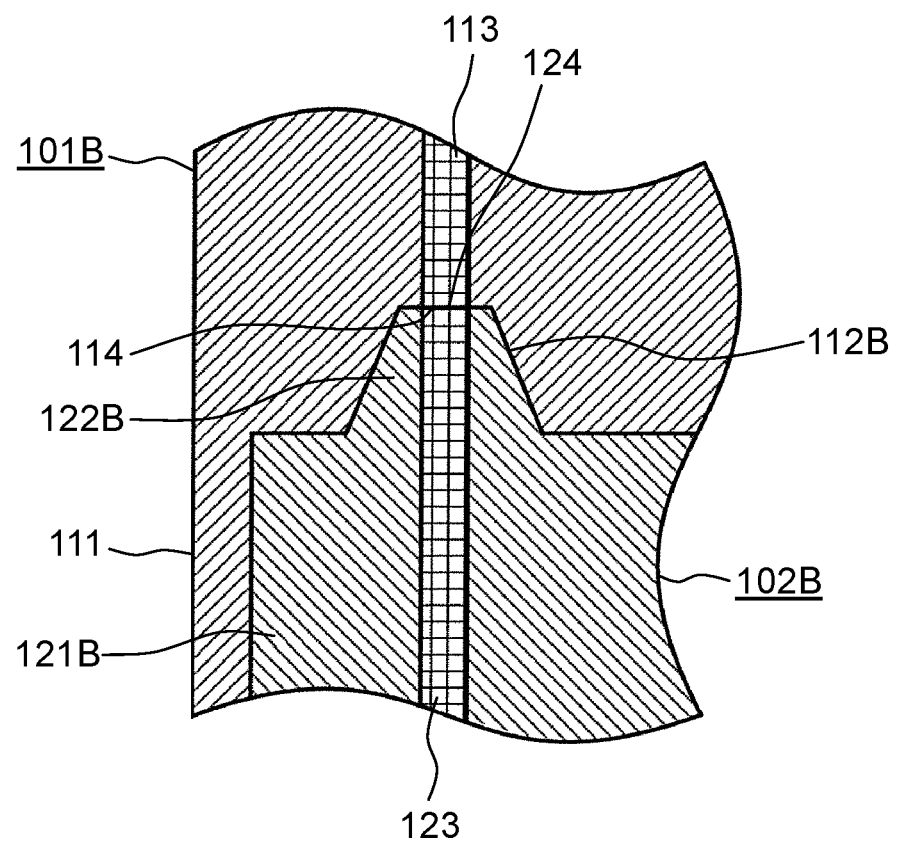
FIG. 14 is a partially sectional view schematically illustrating a fitting example between a first recessed part and a first projection according to another exemplary embodiment.

FIG. 14 is a partially sectional view schematically illustrating a fitting example between first recessed part 112B and first projection 122B according to another exemplary embodiment.

As illustrated in FIG. 14, for example, receptacle 101B may have first recessed part 112B provided for each first transmission body 113, and insertion part 121B of plug 102B may have first projection 122B provided for each second transmission body 123. Moreover, first recessed part 112B and first projection 122B may be formed to fit each other in shape.

Figure 15:
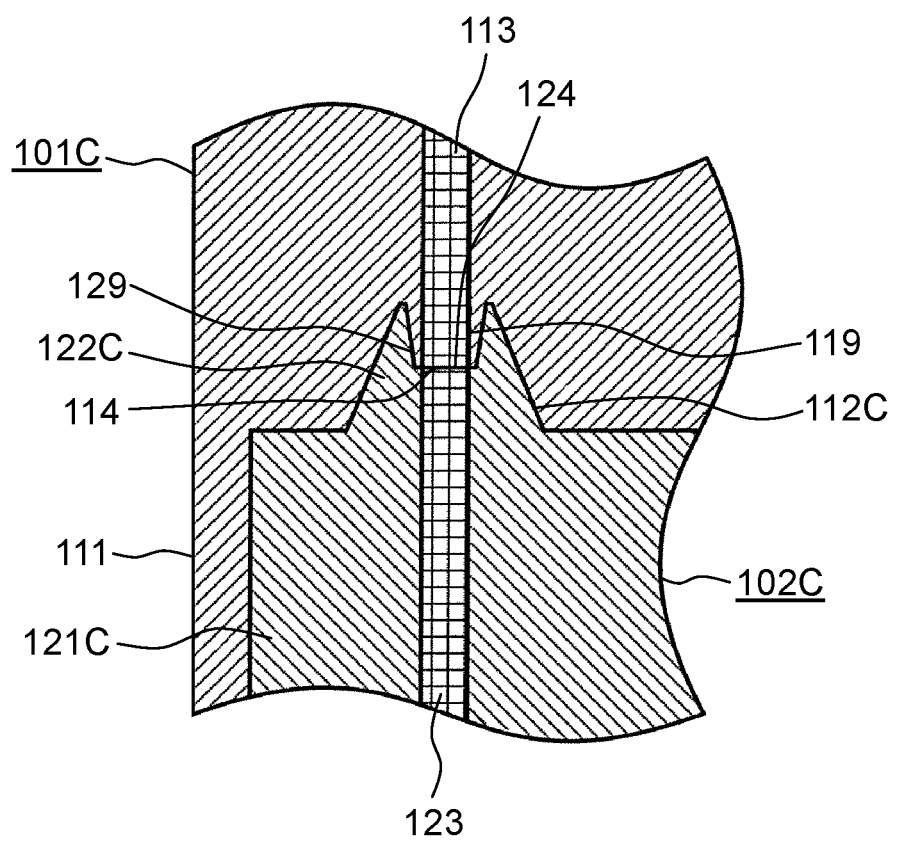
FIG. 15 is a partially sectional view schematically illustrating another fitting example between a first recessed part and a first projection according to another exemplary embodiment.

FIG. 15 is a partially sectional view schematically illustrating another fitting example between first recessed part 112C and first projection 122C according to another exemplary embodiment.

As illustrated in FIG. 15, for example, receptacle 101C may include, at a bottom of first recessed part 112C, second projection 119 that projects toward second recessed part 129 of plug 102C. Insertion part 121C of plug 102C may include, in a projecting end of first projection 122C, second recessed part 129 into which second projection 119 is inserted. First recessed part 112C and first projection 122C may be formed to fit each other in shape, and second projection 119 and second recessed part 129 may be formed to fit each other in shape.

Moreover, first end 114 may be disposed at a projecting edge of second projection 119, and second end 124 may be disposed at a bottom of second recessed part 129. Therefore, since second end 124 disposed at the bottom of second recessed part 129 deeper than a leading edge of plug 102C is not exposed at the leading edge of plug 102C, smearing of second end 124 by finger touch or the like can be suppressed. In addition, when dust accumulates near a leading end of second projection 119, the dust can be pushed toward the bottom of first recessed part 112C during insertion of first projection 122C into tubular body 111. Therefore, the dirt can be removed from first end 114.

Figure 16:
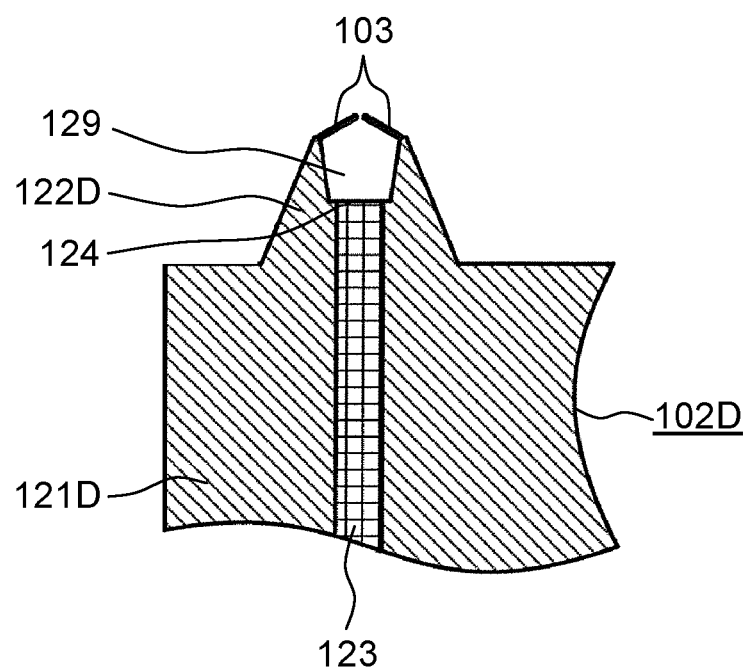
FIG. 16 is a partially sectional view schematically illustrating a first projection of a plug and the first projection's proximity according to another exemplary embodiment.

FIG. 16 is a partially sectional view schematically illustrating first projection 122D of plug 102D and its proximity according to another exemplary embodiment. FIG. 16 schematically illustrates an aspect in which wiping member 103 is mounted to a projecting edge of first projection 122D.

Figure 17:
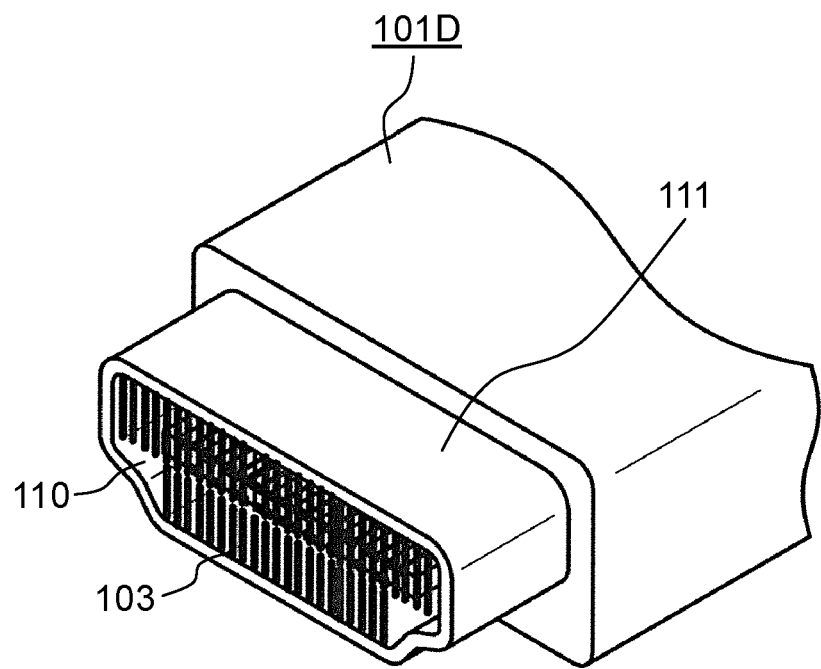
FIG. 17 is a perspective view schematically illustrating an aspect in which wiping member is mounted to a receptacle according to another exemplary embodiment.

FIG. 17 is a perspective view schematically illustrating receptacle 101D according to another exemplary embodiment. FIG. 17 schematically illustrates an aspect in which wiping member 103 is mounted to receptacle 101D.

As illustrated in FIG. 16, for example, insertion part 121D of plug 102D may include, at the projecting edge of first projection 122D, wiping member 103 that has flexibility and resiliency and that is protrusively positioned to cover at least a part of second end 124. Alternatively, as illustrated in FIG. 17, receptacle 101D may include similar wiping member 103 that is positioned inside tubular body 111 to cover at least a part of first end 114. As a result, when, for example, plug 102D and receptacle 101C illustrated in FIG. 15 are connected to each other, wiping member 103 can remove dust adhered to first end 114 of receptacle 101C. Alternatively, wiping member 103 can remove dust adhered to second ends 124 when receptacle 101D and any one of plugs 102 to 102C are connected. Since at least one of first end 114 and second end 124 is substantially blocked by wiping member 103, adhesion of dust to the at least one of first end 114 and second end 124 can also be suppressed even when receptacle 101D and plug 102D are left unconnected.

In some cases, laser light that is used for optical transmission is emitted from unconnected receptacle 101D and unconnected plug 102D. Wiping member 103 may be used also as a cover that shields against such laser light for prevention of direct entry of the laser light into an eye of a user.

A shape of wiping member 103 and material for wiping member 103 are not specifically limited. The material for wiping member 103 may be any material having flexibility and resiliency. A member of choice, such as in the form of a rubber spatula or a brush made of a plurality of fibers, can be used as wiping member 103.

FIG. 18 is a sectional view schematically illustrating connector 100E equipped with heat generator 105 according to another exemplary embodiment.

As illustrated in FIG. 18, for example, receptacle 101E of connector 100E may include first power terminals 151 that perform power transfer as distinct from an HDMI specification. Further, plug 102E of connector 100E may include second power terminals 152 that are respectively connected to first power terminals 151, and heat generator 105 that generates heat when first power terminals 151 are connected to second power terminals 152, respectively. In connector 100E thus configured, a part where first end 114 of receptacle 101E and second end 124 of plug 102E are connected to each other can be maintained at a predetermined temperature by the heat generated by heat generator 105. Therefore, adhesion of dew drops and others to the part where optical transmission lines are connected can be suppressed. It is to be noted that heat generator 105 may be included in receptacle 101E.

It is to be noted that, in each of the above connectors, a plurality of the recessed parts and a plurality of the projections may be present or the recessed part and the projection may be disposed in each of positions between which substrate 115 is sandwiched thickness-wise.

As described above, in the connector according to the present disclosure, the first recessed part may include, at its bottom, the second projection projecting toward the plug, and the first projection may include, in its projecting end, the second recessed part into which the second projection is inserted. Moreover, the first end may be disposed at the projecting edge of the second projection, and the second end may be disposed at the bottom of the second recessed part.

The connector of the present disclosure may further include the wiping member that has flexibility and resiliency and is protrusively positioned to cover at least the part of the first end or the second end.

In the connector of the present disclosure, the wiping member may approximately block the at least one of the first end and the second end.

Furthermore, the connector of the present disclosure may include the first power terminals that perform power transfer as distinct from the HDMI specification, the second power terminals that are respectively connected to the first power terminals, and the heat generator that generates heat when the first power terminals are connected to the second power terminals, respectively.

It is to be noted that connector 100E is one example of the connector. Each of receptacle 101B, receptacle 101C, receptacle 101D, and receptacle 101E is one example of the receptacle. Each of plug 102B, plug 102C, plug 102D, and plug 102E is one example of the plug. Each of insertion part 121B, insertion part 121C, and insertion part 121D is one example of the insertion part. Each of first recessed part 112B and first recessed part 112C is one example of the first recessed part. Each of first projection 122B, first projection 122C, and first projection 122D is one example of the first projection. First power terminal 151 is one example of the first power terminal. Second power terminal 152 is one example of the second power terminal. Heat generator 105 is one example of the heat generator.

The exemplary embodiments have been described above as being illustrative of the technique of the present disclosure, and the appended drawings and the detailed description have been provided for this purpose.

For illustration of the above technique, therefore, the constituent elements that are illustrated in the appended drawings and are described in the detailed description can include not only constituent elements that are essential for solving the problem but also constituent elements that are not essential for solving the problem. For this reason, those nonessential constituent elements that are illustrated in the appended drawings and are described in the detailed description should not immediately be acknowledged as essential.

In addition, since the above exemplary embodiments are intended to be illustrative of the technique of the present disclosure, various modifications, replacements, additions, omissions, and others can be made within the scope of the claims or equivalents of the claims.

INDUSTRIAL APPLICABILITY

The present disclosure can be used, for example, in connecting transmission lines that are used to transmit high definition video/audio signals. Specifically, the present disclosure is applicable to a connector, a receptacle, and a plug.

REFERENCE MARKS IN THE DRAWINGS 100, 100A, 100E: connector
101, 101A, 101B, 101C, 101D, 101E: receptacle
102, 102A, 102B, 102C, 102D, 102E: plug
103: wiping member
105: heat generator
110: holding space
111: tubular body
112, 112B, 112C: first recessed part
113: first transmission body
114: first end
115: substrate
116: first terminal
119: second projection
121, 121A, 121B, 121C, 121D: insertion part
122, 122B, 122C, 122D: first projection
123: second transmission body
124: second end
125: slot
126: second terminal
129: second recessed part
131: step
132: shoulder
141: first taper part
142: second taper part
143: spring member
144: slope
151: first power terminal
152: second power terminal
200: conventional plug

The invention claimed is:

1. A connector comprising:
a receptacle connectable to a conventional plug being compliant with a high definition multimedia interface (HDMI) specification; and
a plug connectable to the receptacle,
wherein the receptacle includes
a tubular body forming a holding space that enables insertion of the conventional plug,
a first recessed part forming a space that narrows heading from the holding space in an insertion direction of the plug, and
a first transmission body having, as an end of an optical transmission line, a first end that is disposed to be exposed to the inserted plug, and
the plug includes
an insertion part shaped to be insertable into the tubular body,
a first projection projecting from the insertion part in the insertion direction, the first projection being capable of fitting into the first recessed part, and
a second transmission body having, as an end of an optical transmission line, a second end that is disposed to face the first end.

2. The connector according to claim 1, wherein
the first end is disposed at a bottom of the first recessed part, and
the second end is disposed at a projecting edge of the first projection.

3. The connector according to claim 1, wherein
the first recessed part includes, at a bottom of the first recessed part, a second projection projecting toward the plug,
the first projection includes, in a projecting end of the first projection, a second recessed part into which the second projection is inserted,
the first end is disposed at a projecting edge of the second projection, and
the second end is disposed at a bottom of the second recessed part.

4. The connector according to claim 1, wherein
the receptacle includes the first transmission body on each of sides that are outer with respect to both ends of an arrangement of a plurality of first terminals used for connection of electric transmission lines, and
the plug includes the second transmission body that corresponds to the first transmission body outwardly of each of both ends of an arrangement of a plurality of second terminals respectively connected to the plurality of first terminals.

5. A connector comprising:
a receptacle connectable to a conventional plug being compliant with a high definition multimedia interface (HDMI) specification; and
a plug connectable to the receptacle,
wherein the receptacle includes
a tubular body forming a holding space that enables insertion of the conventional plug,
a pair of spring members that is respectively disposed on both ends in longitudinal direction of the tubular body inside the tubular body to have a spacing which decreases heading from an opening of the tubular body in an insertion direction of the plug in a section orthogonal to the insertion direction, the pair of spring members being deformed by the inserted conventional plug so that the spacing is increased, and
a first transmission body having, as an end of an optical transmission line, a first end that is disposed to be exposed to the inserted plug, and
the plug includes
an insertion part shaped to be insertable into the tubular body,
slopes that are respectively disposed along both sides of the insertion part to have a spacing which decreases in the insertion direction and that respectively abut against the pair of spring members during insertion into the receptacle, and a second transmission body having, as an end of an optical transmission line, a second end that is disposed to face the first end.

6. The connector according to claim 5, wherein the slopes are disposed as bottoms of grooves formed to have widths that enable insertion of the pair of spring members, respectively.

7. The connector according to claim 1, further comprising a wiping member having flexibility and resiliency, the wiping member being protrusively positioned to cover at least a part of one of the first end and the second end.

8. The connector according to claim 5, further comprising a wiping member having flexibility and resiliency, the wiping member being protrusively positioned to cover at least a part of one of the first end and the second end.

9. The connector according to claim 7, wherein the wiping member substantially blocks at least one of the first end and the second end.

10. The connector according to claim 8, wherein the wiping member substantially blocks at least one of the first end and the second end.

11. The connector according to claim 1, further comprising:

a first power terminal that performs power transfer as distinct from the HDMI specification;

a second power terminal that is connected to the first power terminal; and a heat generator that generates heat when the first power terminal and the second power terminal are connected to each other.

12. The connector according to claim 5, further comprising:

a first power terminal that performs power transfer as distinct from the HDMI specification;

a second power terminal that is connected to the first power terminal; and a heat generator that generates heat when the first power terminal and the second power terminal are connected to each other.

13. A receptacle comprising:

a tubular body forming a holding space that enables insertion of a conventional plug;

a first recessed part forming a space that narrows heading from the holding space in an insertion direction of the plug; and a first transmission body having, as an end of an optical transmission line, a first end that is disposed to be exposed to the inserted plug.

14. A receptacle comprising:

a tubular body forming a holding space that enables insertion of a conventional plug;

a pair of spring members that is respectively disposed on both ends in longitudinal direction of the tubular body inside the tubular body to have a spacing which decreases heading from an opening of the tubular body in an insertion direction of the plug in a section orthogonal to the insertion direction, the pair of spring members being deformed by the inserted conventional plug so that the spacing is increased; and a first transmission body having, as an end of an optical transmission line, a first end that is disposed to be exposed to the inserted plug.

15. A plug connectable to the receptacle of claim 13, the plug comprising:

an insertion part shaped to be insertable into the tubular body;

a first projection projecting from the insertion part in the insertion direction, the first projection being capable of fitting into the first recessed part; and a second transmission body having, as an end of an optical transmission line, a second end that is disposed to face the first end.

16. A plug connectable to the receptacle of claim 14, the plug comprising:

an insertion part shaped to be insertable into the tubular body;

slopes that are respectively disposed along both sides of the insertion part to have a spacing which decreases in the insertion direction and that respectively abut against the pair of spring members during insertion into the receptacle; and a second transmission body having, as an end of an optical transmission line, a second end that is disposed to face the first end.

* * * * *